(12) United States Patent
Moser et al.

(10) Patent No.: US 10,908,441 B2
(45) Date of Patent: Feb. 2, 2021

(54) SYSTEM AND METHOD FOR A RETINAL PROJECTOR BASED ON A SCATTERING REFLECTOR

(71) Applicant: ECOLE POLYTECHNIQUE FEDERALE DE LAUSANNE (EPFL), Lausanne (CH)

(72) Inventors: Christophe Moser, Lausanne (CH); Demetri Psaltis, Préverenges (CH)

(73) Assignee: ECOLE POLYTECHNIQUE FÉDÉRALE DE LAUSANNE (EPFL), Lausanne (CH)

( * ) Notice: Subject to any disclaimer, the term of this patent is extended or adjusted under 35 U.S.C. 154(b) by 0 days.

(21) Appl. No.: 16/656,050

(22) Filed: Oct. 17, 2019

(65) Prior Publication Data
US 2020/0124882 A1    Apr. 23, 2020

Related U.S. Application Data

(63) Continuation of application No. PCT/IB2018/058060, filed on Oct. 17, 2018.

(51) Int. Cl.
*G02B 27/01* (2006.01)
*G02F 1/025* (2006.01)

(52) U.S. Cl.
CPC ......... *G02F 1/025* (2013.01); *G02B 27/0172* (2013.01); *G02B 2027/014* (2013.01); *G02B 2027/0138* (2013.01)

(58) Field of Classification Search
None
See application file for complete search history.

(56) References Cited

U.S. PATENT DOCUMENTS

2011/0221656 A1* 9/2011 Haddick ............ G02B 27/0172
345/8

OTHER PUBLICATIONS

Loterie, Damien, et al., "Digital confocal microscopy through a multimode fiber," Optics Express, vol. 23, No. 18, Sep. 7, 2015, pp. 23845-23858.
Popoff, S. M., et al., "Measuring the Transmission Matrix in Optics: An Approach to the Study and Control of Light Propagation in Disordered Media," Physical Review Letters 104, Mar. 12, 2010, pp. 100601-1-100601-4.

* cited by examiner

*Primary Examiner* — Jerry Rahll
(74) *Attorney, Agent, or Firm* — Nixon & Vanderhye P.C.

(57) ABSTRACT

A retinal projector system, comprising a coupling means, a spacial light modulator, and a tapered optical waveguide having an input side surface and an output side surface, whereby the input side surface is larger than the output side surface, the coupling means being configured to couple coherent light into the spatial light modulator, the spacial light modulator being configured to receive the coherent light and output modulated light modulated in 2 dimensions towards the input side surface, the tapered optical waveguide being configured to guide the modulated light received at the input side surface and reduce a size of the tapered optical waveguide towards the output side surface, without losing any information from the modulated light at the output side surface such to allow an image formation.

19 Claims, 4 Drawing Sheets

SYSTEM AND METHOD FOR A RETINAL PROJECTOR BASED ON A SCATTERING REFLECTOR

The present application is a continuation application of International Application No. PCT/IB2018/058060, filed Oct. 17, 2018, the entire contents of which are hereby incorporated by reference.

BACKGROUND OF THE INVENTION

Field of the Invention

The present invention relates to a system to project retinal images using a waveguide and a diffusing reflecting layer. One of several key features of this invention is that the combination of a spatial light modulator, the waveguide and the random reflecting diffusing layer produce a large eye box and allows for adaptive focusing of the presented image all in a thin form factor.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

Background Art

Waveguide base retinal projection systems use waveguides which are illuminated by a set of collimated beams representing the Fourier transform of the image to be projected. The collimated beams are reflected by total internal reflection in the waveguide. Several mechanisms such as grating couplers, embedded prisms in the waveguide couple the collimated light outside the waveguide and towards the eye pupil. The outcouplers provide pupil splitting that increases the eye box. The limitation of the collimated light is that there is no convergence or divergence to change the object focusing distance. Hence a fixed object distance is set. Tuning the object distance is however an important requirement for augmented reality/virtual reality headset. The waveguide is also thick enough so that a continuum of angle is allowed so as to preserve spatial resolution.

Hence there is a need for a system that provides a possibility for convergence and/or divergence of the beams outcoupled off the waveguides as well as flexibility in reducing the waveguide thickness for providing a curved waveguide which can be molded.

The invention aims at circumventing all of the previous shortcomings of waveguide based retinal projectors.

SUMMARY OF THE INVENTION

In a first aspect, the invention provides a retinal projector system, comprising a coupling means, a spacial light modulator, and a tapered optical waveguide having an input side surface and an output side surface, whereby the input side surface is larger than the output side surface, the coupling means being configured to couple coherent light into the spatial light modulator, the spacial light modulator being configured to receive the coherent light and output modulated light modulated in 2 dimensions towards the input side surface, the tapered optical waveguide being configured to guide the modulated light received at the input side surface and reduce a size of the tapered optical waveguide towards the output side surface, without losing any information from the modulated light at the output side surface such to allow an image formation.

In a preferred embodiment of the retinal projector system, the spatial light modulator is one of the list comprising a phase modulator, an amplitude modulator, a combination of the phase modulator and the amplitude modulator.

In a further preferred embodiment, the tapered optical waveguide is coated with a reflector on its outside surface which enables to increase light reflection.

In a further preferred embodiment, the tapered optical waveguide is tailored to have at the input side surface dimensions equal to the spatial light modulator's spatial extension, and is towards the output side surface adiabatically transformed into dimensions of substantially 500 micrometers by 500 micrometers which support a number of modes given by a so-called V-number, the tapered optical waveguide producing a pattern at the output side surface which is the superposition of all the modes of the tapered optical waveguide.

In a further preferred embodiment, a material of the tapered optical waveguide is any one of the list comprising glass, plastic, any other suitable material to guide light of any wavelength suitable.

In a further preferred embodiment, the retinal projector system further comprises a further waveguide configured to be in contact with the tapered optical waveguide at the output side surface, and to guide light received from the tapered optical waveguide by total reflection.

In a further preferred embodiment, a material of the further waveguide is the same material as that of the tapered optical waveguide.

In a further preferred embodiment, the further waveguide comprises a reflective layer, the reflective layer being configured as a scattering layer that is configured to couple to a plurality of light directions out of the further waveguide intended towards an eye pupil of a user.

In a further preferred embodiment, the scattering layer is positioned to be disposed in frot of the eye pupil of the user, and that every point of scattering layer acts as a secondary point source radiating a spherical wave towards the eye pupil, a phase of each spherical wave being controlled by the spatial light modulator via a calibration of the system, the image formation being created by interference and a distance of an object appearing as a result of the image formation appearing to the user being adjustable by controlling the spatial light modulator, through addition of a quadrative phase front to the secondary point source.

In a further preferred embodiment, the scattering layer comprises a random disposition of scattering particles.

In a further preferred embodiment, the scattering layer comprises a structured scattering layer configured to impinge a preferential scattering direction.

In a further preferred embodiment, the retinal projector system comprises instead of the tapered optical waveguide, a fiber bundle configured to be butt coupled to the spatial light modulator whereby a lens array if placed on the spatial light modulator such to demagnify a pixel size of the spatial light modulator.

In a further preferred embodiment, the reflective layer is any one of the list comprising a metallic coating and a dielectric coating, the reflective coating being embedded in a material from the further waveguide in such a way that beam of light passing through the further waveguide from the side at an angle from the further waveguide, substantially keeps it same direction of propagation.

In a further preferred embodiment, the further waveguide has a curved shaped.

In a further preferred embodiment, the retinal projection system further comprises a coherent light source configured to produce the coherent light, configured to produce coherent light that has a temporal coherence allowing interference to occur in the image formation.

In a second aspect, the invention provides a method for calibrating a linear transfer function between a spatial light modulator from a retinal projection system as described herein above, and a retina of an eye, comprising presenting a series of input patterns, measuring corresponding output patterns for the input patterns, and applying any of the list comprising a matrix method and a machine learning method.

In a third aspect, the invention provides a pair of optical eye glasses mounted on at least a branch, comprising a retinal projection system as described herein above, disposed at any one of the list comprising a side of the branch, a top of the eye glass, a bottom of the eye glass.

In a fourth aspect, the invention provides a method for projecting in a projection area an image with the projection system as described herein above, comprising disposing a high resolution image content of the image in a viewing direction of the projection area, and configuring a remaining part of a projection area to have low resolution.

In a further preferred embodiment, the viewing direction is inferred with an eye tracking system.

BRIEF DESCRIPTION OF THE DRAWINGS

These and other features, aspects and advantages of the present invention will become better understood with regard to the following description, appended claims and accompanying drawings where:

DETAILED DESCRIPTION OF PREFERRED EMBODIMENTS

Figure 1:
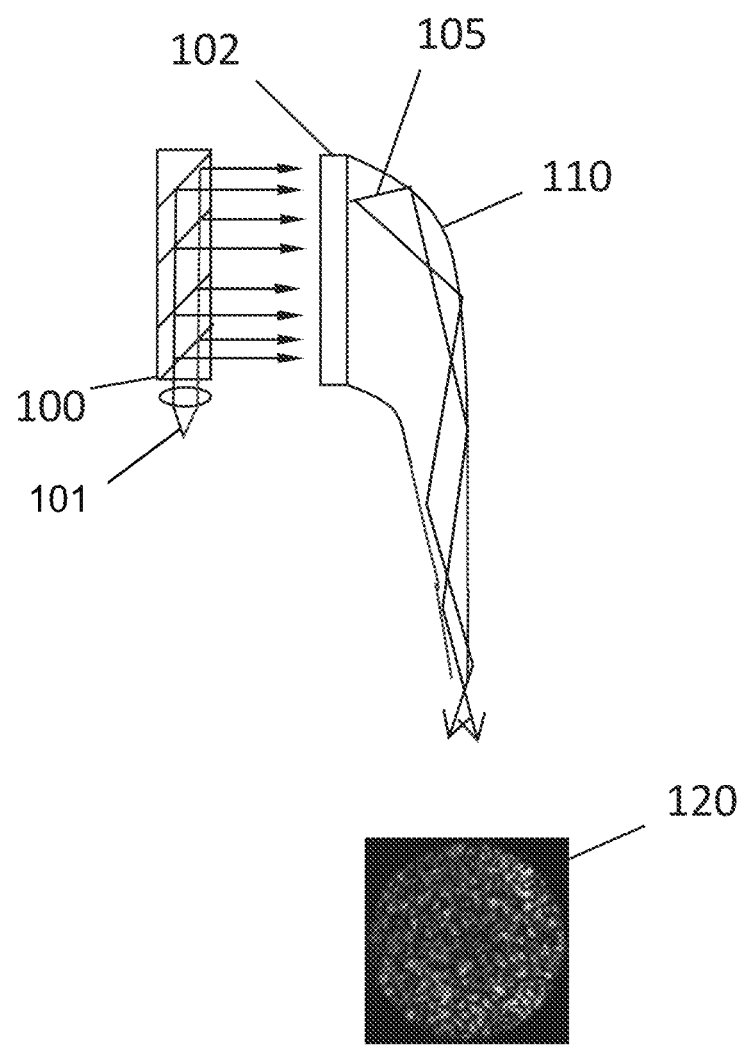
FIG. 1 contains a schematic of a compact system to couple light from a spatial light modulator into a tapered waveguide, according to an example embodiment of the invention. The system forms a waveguide projector.

An embodiment of the invention provided a lightguide that couples the modulated light into a waveguide which can be, but is not restricted to, coated with a reflector on its outside surface to increase light reflection for the case where light cannot be guided by total internal reflection. The waveguide can be tailored, by way of example, to have dimensions equal to the SLM spatial extension on one end and adiabatically transformed into dimensions of the order but not limited to 500 micrometers by 500 micrometers which support a number of modes given by the so-called V-number. The waveguide produces a pattern at its output which is the superposition of all the modes of the waveguide. This forms the first waveguide. The material of the waveguide can be glass, plastic or any other suitable material to guide light of any wavelength suitable. Visible light and/or infrared form another embodiment.

In another embodiment, a second waveguide is in contact with the said first waveguide. The second waveguides can be made of the same material, but not restricted to, the material of the said first waveguide.

Light entering the second waveguide is guided by total internal reflection. Enclosed in the second waveguide is a reflective layer which is a scattering layer that allows coupling to a number of light directions out of the waveguide towards the eye pupil.

The reflective layer can be a metallic coating, a dielectric coating, but not restricted to, which is embedded in the material of the waveguide in such a way that a beam of light coming from the outside (for example when seeing through the waveguide approximately perpendicular to it) does not change its direction. This is because the material on both sides of the said scattering reflective layer is the same and hence the index matching does not disturb the through vision. In another embodiment, the second waveguide is curved.

Another embodiment is to calibrate the linear transfer function between the SLM and the retina, which is not a one to one mapping as it is with the state of the art retinal projection system. This mapping can be calibrated with a matrix method as described in (S. M. Popoff, G. Lerosey, R. Carminati, M. Fink, A. C. Boccara, and S. Gigan, Measuring the Transmission Matrix in Optics: An Approach to the Study and Control of Light Propagation in Disordered Media, Phys. Rev. Lett. 104, 2010./Loterie D., Farahi S. Papadopoulos I., Goy A., Psaltis D., Moser C., *Digital confocal microscopy through a multimode fiber*, Optics Express, Vol. 23, Issue 18, pp. 23845-23858, 2015.) or with a machine learning approach, that is to say by presenting a series of input patterns and measuring the respective output patterns with a camera.

The light source illuminating the SLM is coherent and having a temporal coherence such that interference occur in the image formation. The scattering layer embedded in the waveguide disposed in front of the eye pupil is such that every point of the scattering layer acts as a secondary point source radiating a spherical wave towards the eye pupil. Effectively, the phase of each spherical wave is controlled by the SLM via a calibration of the system. Thus an arbitrary pattern at the retina is formed by adjusting the phase of each individual secondary point source. It is possible because image formation is created by interference. In the proposed system, the imaging is not performed as point to point imaging. In other words, the point spread function (PSF) is a distributed speckle pattern. The distance of the object appearing to the viewer can be adjusted by changing the input SLM which is effectively realized by adding a quadrative phase front to the secondary point sources. The eye box is large and defined by the angular extent of the radiating secondary point source defining an area at the pupil. The scattering layer can be a random disposition of scattering particles or a structured scattering layer to imping a preferential scattered direction.

The projection system can be disposed on the side, but not limited to the branch of a pair of glasses, on the top or bottom the eye glass.

The human visual acuity is high only in the fovea which represents approximately 2 degrees field of view. The projection system can be configured in such a way that the high resolution image content is disposed in the viewing direction and the remaining part of the projection area is configured to have low resolution. This dynamic resolution configuration on the display is another embodiment of the invention. The viewing direction can be, but not restricted to, inferred with an eye tracking system.

The scattering layer embedded in the waveguide can be curved and/or the outer surface can have refractory power for a custom ophthalmic prescription for through vision.

The light source can be a RGB source for example but not limited to. The calibration can be done for each color separately and then time multiplexed.

Another embodiment is to use a specific waveguide in front of the SLM. The specific waveguide is a fiber bundle that is butt coupled to the SLM. A lens array may be placed on top of the SLM to demagnify the typically large pixel size of the SLM (typically 10 um). In this way there is a one to one mapping from the pixels of the SLM to the pixels of the fiber bundle. There are currently fiber bundles with 100,000 cores with spacing of 2-3 micrometers. Then the output of such projector is used in the same fashion as in FIGS. 2,3 and 4.

More precisely, in FIG. 1, a point light source 101 is collimated and enters element 100 which is configured to outcouple light towards a spatial light modulator (SLM) 102. The point light source 101 can be a multitude of colors, such as Red Green Blue (RGB) or an infrared light or any other wavelength of the electro-magnetic spectrum. It is understood that the system is calibrated for each color. The light source 101 has a sufficient coherence length, such as provided by a laser (semi-conductor), VCSEL, Super luminescent light emitting diode (SLED). The configuration shown is in transmission by way of example but it is not restricted to. The polarization of the light can be prepared to enter the SLM 102 in a preferential direction to obtain the highest modulation efficiency. The SLM 102 can be phase only, analog or binary, or amplitude or a combination thereof. A tapered optical waveguide 110 is disposed in close proximity or in contact with the SLM 102 for the purpose of guiding the light and reducing the size of the waveguide 110 without losing information. The waveguide 110 may be coated with a reflective layer to increase reflection for the case where total internal reflection is not satisfied. By way of example, two rays 105 from a single pixel are shown in FIG. 1. The output of the waveguiding element, i.e., the waveguide 110 is typically a speckle pattern 120 which is the result of interference of many pathlength differences from the multitude of light rays.

Figure 2:
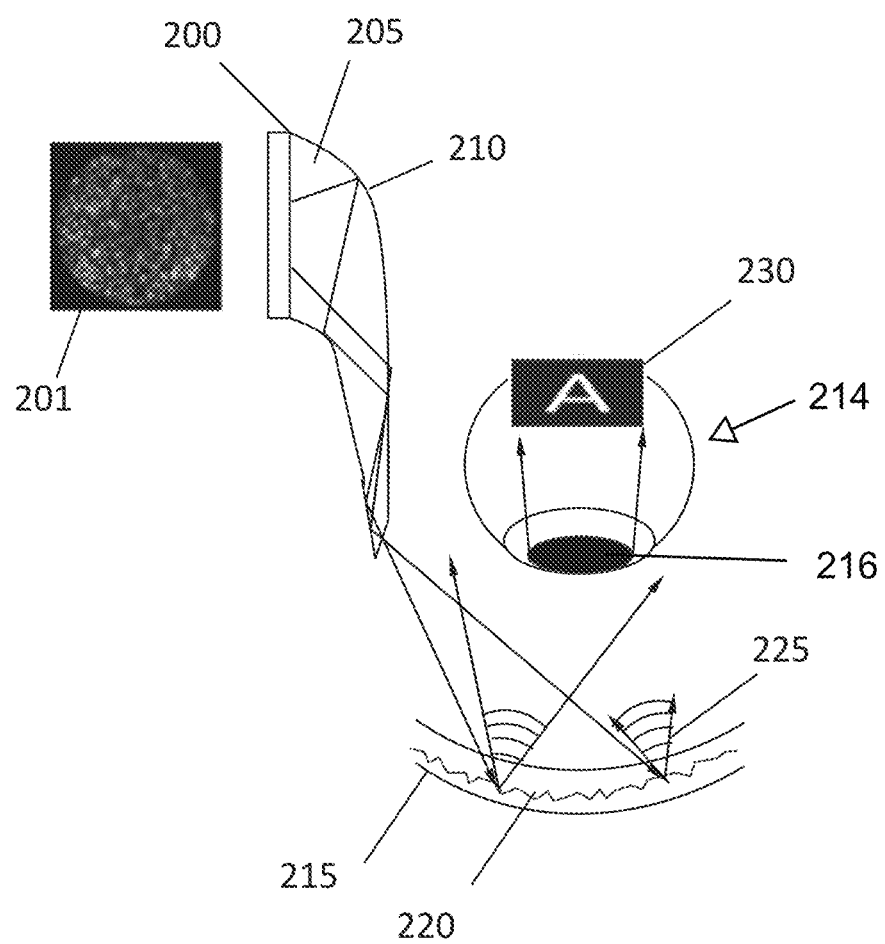
FIG. 2 contains a schematic of a display for augmented reality illustrating the waveguide projector illuminating an eye glass element having a scattering layer embedded to reflect light towards the eye pupil, according to a further example embodiment of the invention.

In FIG. 2, a schematic of a retinal projection for augmented reality/virtual reality is shown. A pre-computed pattern 201 is loaded onto an SLM 200 and illuminated by a coherent light source (light source not illustrated in FIG. 2). A waveguide 210 guides the spatially modulated light towards a distal end of the waveguide 210. The waveguide 210 can be made out of a plastic molded material. An element 215 is disposed in front of an eye(s) 214 (monocular or binocular) of an intended user (user not shown in FIG. 2). The element 215 is made out of a transparent material for through vision. Inside the element 215 is a reflective scattering layer 220 that reflects and randomizes light towards an eye pupil 216 of the eye 214. The layer 220 does not affect through vision because the same material is disposed on each side. The purpose of the scattering layer 220 is to provide a range of outcoupling propagation directions. Each point 225 of the scattering layer 220 can be viewed as spherical wave having a phase that depends on the local microstructure. The pre-computed pattern 201 is such that an image 230 is formed at a retina of the eye 214, by interference.

Figure 3:
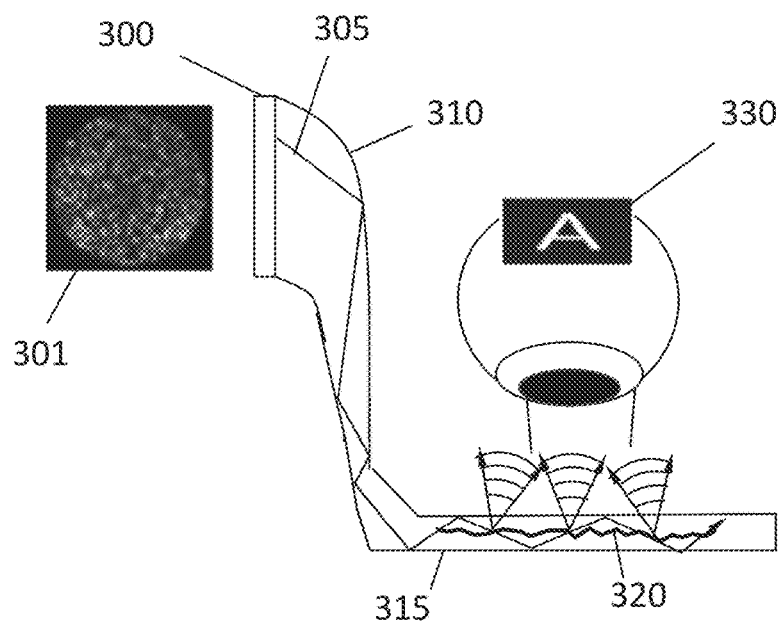
FIG. 3 contains another schematic of a display for augmented reality illustrating the waveguide projector illuminating a waveguided eye glass element having a scattering layer embedded to reflect light towards the eye pupil, according to a further example embodiment of the invention.

In FIG. 3, another schematic of a retinal projection for augmented reality/virtual reality is shown. A pre-computed pattern 301 is loaded onto an SLM 300 and illuminated by a coherent light source (light source not shown in FIG. 3). A first waveguide 310 guides the spatially modulated light towards a distal end of the waveguide 310. The waveguide 310 can be made out of a plastic molded material. Another waveguide element 315 is disposed in closed proximity or even in contact for better light efficiency coupling to the first waveguide 310. It is made out of a transparent material for through vision. Inside the waveguide element 315 is a reflective scattering layer 320 that reflects and randomizes light towards the eye pupil. The layer 320 does not affect through vision because the same material is disposed on each side. The purpose of the scattering layer 320 is to provide a range of outcoupling propagation directions. Each point of the scattering layer 320 can be viewed as spherical wave having a phase that depends on the local microstructure. The pre-computed pattern is such that the phases of each individual point scatterer form an image 330 at the retina by interference.

Figure 4:
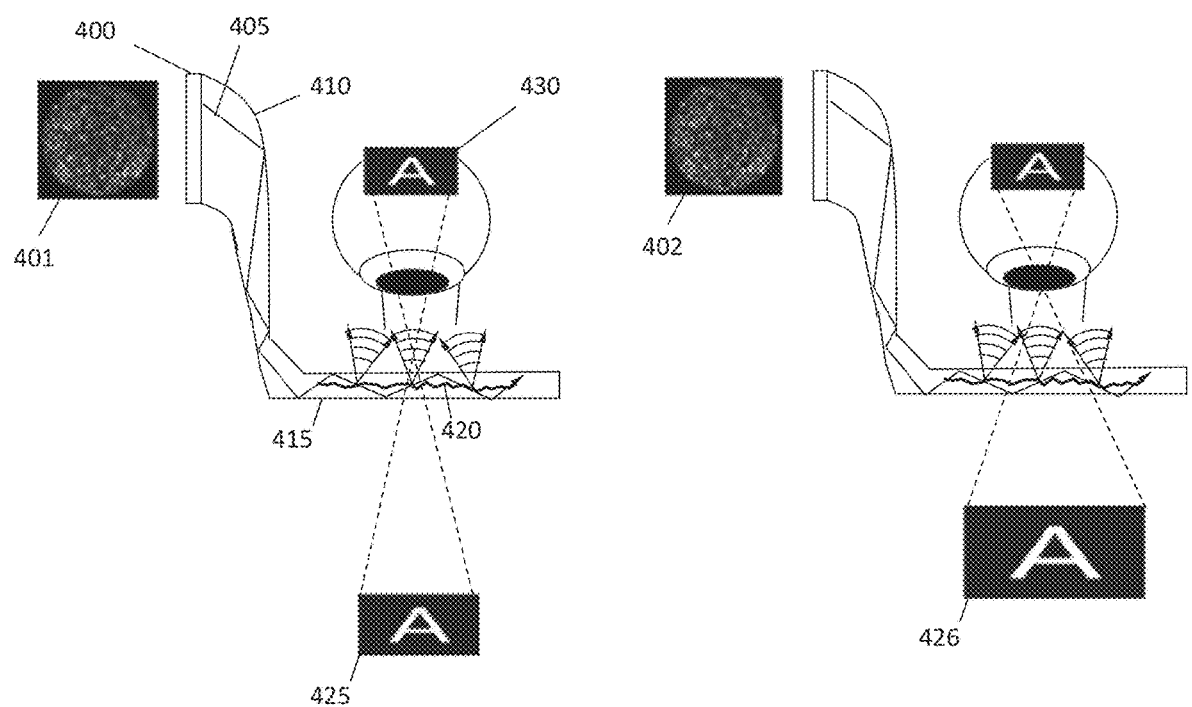
FIG. 4 contains a schematic of a display for augmented reality illustrating placing an image at virtual distance to the user by placing the appropriate pattern on the SLM, according to a further example embodiment of the invention.

FIG. 4 illustrates that with a pre-computed input pattern 401 loaded into an SLM 400, a displayed object 425 can be placed at defined distance away from the eye. In essence the object 430 appears in focus at a specific distance away from the user. By changing the input pattern 402, the same object, illustrated with reference 426 on the right part of FIG. 4, can be moved further away from the user.

Figure 5:
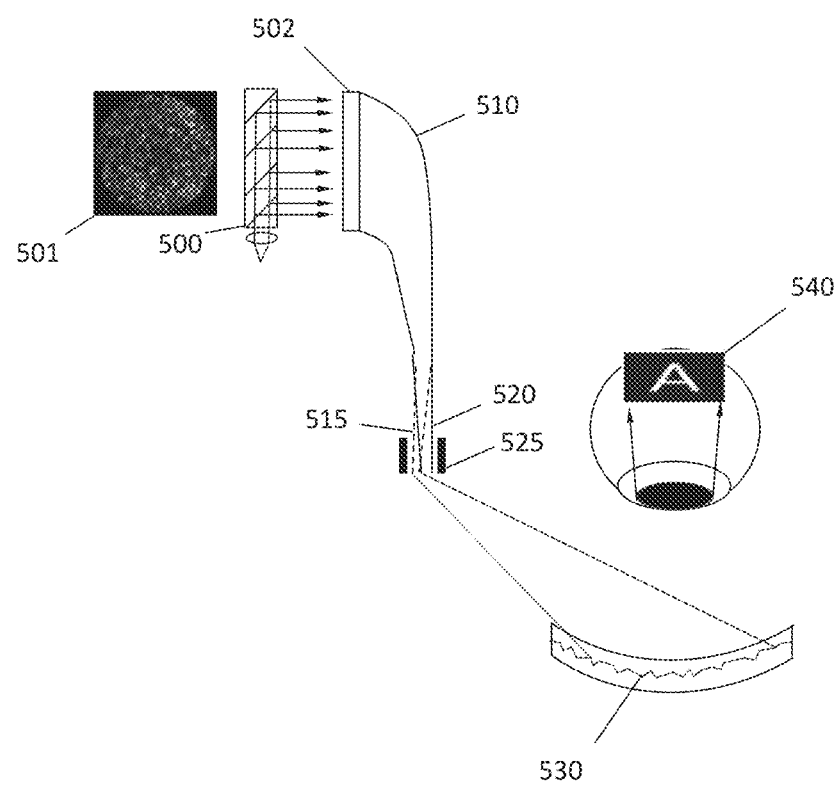
FIG. 5 contains a schematic of a display for augmented reality illustrating the use of an actuator at the tip of the fiber in order to provide a half pixel shift in the image on the retina, according to an example embodiment of the invention. By shifting a pattern imaged on the retina by half pixel in each of the West, East, North and South direction and displaying a new pattern in each of the orientation, the integration time of the retina is long enough that it appears the resolution of the display is artificially increased by a factor 4 in pixel count.

In FIG. 5, a scheme is shown to make use of a low resolution display (e.g 1K×1K) to obtain an effective higher resolution display by a factor 4 (e.g 2K×2K). This is accomplished by taking advantage of the slow response time (or integration time) of the photoreceptors which is typically 30 Hz for the fovea and 60 Hz for the periphery. A pattern 501 is loaded on an SLM 502. A light guide 510 is tapered to a small waveguide size 520 at the distal end. An actuator 525 is placed around the waveguide 510 to actuate (either magnetically or electrically) the fiber tip laterally in East-West-South-North direction. By way of example, the waveguide 510 is shifted from West position 520 to East to position 515. The actuation is small and equal to half a pixel in each 4 directions. After each actuation, a new shifted pattern is loaded. The speed of the actuation and image loading is at least 200 Hz in order for the user not to perceive motion. Because of the small shift (half a pixel or 5 micrometers approximately), the reflection from the scattering layer 530 is shifted by the memory effect, hence there is no need to recompute the new image. It only suffice to shift the input pattern electronically.

In the case where the coupling waveguide to the SLM is a fiber bundle, the actuation of the fiber bundle tip by a few pixels is necessary to "fill in" the gap in the image due to the void in the intercore spacing (a fiber bundle has approximately a 50% fill factor).

The computation of the pattern to load onto the SLM can be done in several ways which is explained by way of example but not limited to.

The transfer function between the plane of the SLM and the curved plane of the retina is a linear transform. The purpose of the calibration is to measure this transfer function. In a first embodiment, this function is measured as a matrix. An image is represented as a linear vector and the image output is found by multiplying the input vector by the matrix. The matrix can be measured by sending different patterns with the SLM forming an orthogonal basis (Fourier, Hadamard or other) and measuring the image output with a camera. The camera can be placed between the eye pupil and the said scattering layer. It can be an interferometric detection to obtain the phase and amplitude. The camera can also be placed at the focal plane of an eye model. By decomposing each output image into the basis vector, we obtain the coefficients (complex if image is measured interferometrically) of the matrix (a raw or a column of the matrix).

Another approach to measure the transfer function is machine learning (deep learning). The transfer function is learned by sending many input/output patterns (intensity only detection or complex detection). The learning is done in typically many layers neural network depending on the complexity. The latter approach is more robust to environmental perturbation.

Once the neural network is learned, the system is calibrated. The output is then a series of matrix multiplication followed by non-linearities.

Summarizing, the invention discloses a system and method to display images in a near-the-eye display, monocular or binocular. Many of the shortcomings of current architectures are here overcome such as the ability to place objects at different depth without affecting the eye box or the size of the display and reconfiguring dynamically the resolution of the display such that only the foveated image is displayed at full resolution.

The invention claimed is:

1. A retinal projector system, comprising
a coupling means,
a spacial light modulator,
a tapered optical waveguide having an input side surface and an output side surface, whereby the input side surface is larger than the output side surface, and
a transparent element comprising a reflecting scattering layer that is inside the transparent element,
the coupling means is configured to couple coherent light into the spatial light modulator,
the spacial light modulator is configured to receive the coherent light and output modulated light that is modulated in 2 dimensions towards the input side surface,
the tapered optical waveguide is configured to guide the modulated light received at the input side surface and reduce a size of the tapered optical waveguide towards the output side surface, without losing any information from the modulated light at the output side surface such to allow an image formation,
the transparent element is configured to reflect light received from the output side surface.

2. The retinal projector system of claim 1, wherein the spatial light modulator is a phase modulator, an amplitude modulator, or a combination of the phase modulator and the amplitude modulator.

3. The retinal projector system of claim 1, wherein the tapered optical waveguide is coated with a reflector on its outside surface which enables to increase light reflection.

4. The retinal projector system of claim 1, wherein the tapered optical waveguide is tailored to have at the input side surface dimensions equal to the spatial light modulator's spatial extension, and is towards the output side surface adiabatically transformed into dimensions of substantially 500 micrometers by 500 micrometers which support a number of modes given by a so-called V-number, the tapered optical waveguide producing a pattern at the output side surface which is the superposition of all the modes of the tapered optical waveguide.

5. The retinal projector system of claim 1, wherein a material of the tapered optical waveguide is any one of the list comprising glass, plastic, any other suitable material to guide light of any wavelength suitable.

6. The retinal projector system of claim 1, wherein the transparent element is a further waveguide configured to be in contact with the tapered optical waveguide at the output side surface, and to guide light received from the tapered optical waveguide by total reflection.

7. The retinal projector system of claim 6, wherein a material of the further waveguide is the same material as that of the tapered optical waveguide.

8. The retinal projector system of claim 6, where the further waveguide comprises a reflective layer, the reflective layer being configured as a scattering layer that is configured to couple to a plurality of light directions out of the further waveguide intended towards an eye pupil of a user.

9. The retinal projector system of claim 8, further wherein the scattering layer is positioned to be disposed in front of the eye pupil of the user, and that every point of scattering layer acts as a secondary point source radiating a spherical wave towards the eye pupil, a phase of each spherical wave being controlled by the spatial light modulator via a calibration of the system, the image formation being created by interference and a distance of an object appearing as a result of the image formation appearing to the user being adjustable by controlling the spatial light modulator, through addition of a quadrative phase front to the secondary point source.

10. The retinal projector system of claim 8, wherein the scattering layer comprises a random disposition of scattering particles.

11. The retinal projector system of claim 8, wherein the scattering layer comprises a structured scattering layer configured to impinge a preferential scattering direction.

12. The retinal projector system of claim 8, further wherein the reflective layer is any one of the list comprising a metallic coating and a dielectric coating, the reflective coating being embedded in a material from the further waveguide in such a way that beam of light passing through the further waveguide from the side at an angle from the further waveguide, substantially keeps it same direction of propagation.

13. The retinal projection system of claim 6, further wherein the further waveguide has a curved shaped.

14. The retinal projector system of claim 1, comprising instead of the tapered optical waveguide, a fiber bundle configured to be butt coupled to the spatial light modulator whereby a lens array if placed on the spatial light modulator such to demagnify a pixel size of the spatial light modulator.

15. The retinal projection system of claim 1, further comprising a coherent light source configured to produce the coherent light, configured to produce coherent light that has a temporal coherence allowing interference to occur in the image formation.

16. A method for calibrating a linear transfer function between a spatial light modulator from a retinal projection system as described in claim 1, and a retina of an eye, comprising
   presenting a series of input patterns,
   measuring corresponding output patterns for the input patterns, and
   applying any of the list comprising a matrix method and a machine learning method.

17. A pair of optical eye glasses mounted on at least a branch, comprising a retinal projection system according to claim 1 disposed at any one of the list comprising a side of the branch, a top of the eye glass, a bottom of the eye glass.

18. A method for projecting in a projection area an image with the projection system according to claim 1, comprising disposing a high resolution image content of the image in a viewing direction of the projection area, and configuring a remaining part of a projection area to have low resolution.

19. The method of claim 18, further wherein the viewing direction is inferred with an eye tracking system.

* * * * *